United States Patent
Kwon et al.

(10) Patent No.: US 9,204,461 B2
(45) Date of Patent: Dec. 1, 2015

(54) METHOD FOR RANDOM ACCESS TO UPLINK IN MULTI-CARRIER AGGREGATION ENVIRONMENT

(75) Inventors: Yeong Hyeon Kwon, Gyeonggi-do (KR); Min Seok Noh, Gyeonggi-do (KR); Jin Sam Kwak, Gyeonggi-do (KR); Jae Hoon Chung, Gyeonggi-do (KR); Seung Hee Han, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 13/126,742

(22) PCT Filed: Oct. 29, 2009

(86) PCT No.: PCT/KR2009/006281
§ 371 (c)(1),
(2), (4) Date: Apr. 28, 2011

(87) PCT Pub. No.: WO2010/050753
PCT Pub. Date: May 6, 2010

(65) Prior Publication Data
US 2011/0206000 A1    Aug. 25, 2011

Related U.S. Application Data

(60) Provisional application No. 61/109,189, filed on Oct. 29, 2008.

(30) Foreign Application Priority Data

May 13, 2009   (KR) .................... 10-2009-0041555

(51) Int. Cl.
*H04W 72/04*   (2009.01)
*H04W 74/00*   (2009.01)
*H04W 74/08*   (2009.01)

(52) U.S. Cl.
CPC ........ *H04W 74/002* (2013.01); *H04W 74/0833* (2013.01)

(58) Field of Classification Search
USPC .................... 370/229, 330, 431, 437, 48
See application file for complete search history.

(56) References Cited

U.S. PATENT DOCUMENTS 6,259,724 B1    7/2001   Esmailzadeh
2004/0147263 A1*  7/2004   Schwarz et al. ........... 455/436
(Continued)

FOREIGN PATENT DOCUMENTS

WO     WO 2009075631 A2 *  6/2009

OTHER PUBLICATIONS

ETSI TS 136 331 V8.3.0 (Nov. 2008), LTE; Evolved Universal Terrestrial Radio Access (E-UTRA); Radio Resource Control (RRC); Protocol specification (3GPP TS 36.331 version 8.3.0 Release 8) (Sep. 23, 2008), pp. 109-111.*

(Continued)

*Primary Examiner* — Hahn N Nguyen
*Assistant Examiner* — Jose Perez
(74) *Attorney, Agent, or Firm* — Lee, Hong, Degerman, Kang & Waimey

(57) ABSTRACT

The present invention relates to an access method for solving ambiguity between an initial access mobile station and a base station, wherein the ambiguity occurs in a carrier aggregation environment. When a base station transmits a downlink message including different downlink ID information through plural downlink carriers, a base station obtains the corresponding downlink ID information through a downlink carrier used by the mobile station. The mobile station transmits an uplink message using the obtained downlink ID information, and the base station extracts the downlink ID information from the uplink message in order to confirm which downlink carrier the mobile station uses.

5 Claims, 7 Drawing Sheets

(56) References Cited

U.S. PATENT DOCUMENTS

| | | |
|---|---|---|
| 2006/0223461 A1* | 10/2006 | Laroia et al. ............... 455/103 |
| 2008/0025240 A1 | 1/2008 | Casaccia et al. |
| 2008/0070610 A1 | 3/2008 | Nishio |
| 2008/0161002 A1 | 7/2008 | Karimi et al. |
| 2008/0316961 A1* | 12/2008 | Bertrand et al. ............. 370/329 |
| 2009/0197542 A1* | 8/2009 | Buckley et al. ............... 455/70 |
| 2009/0232062 A1* | 9/2009 | Higuchi et al. ............... 370/329 |
| 2010/0074130 A1* | 3/2010 | Bertrand et al. ............. 370/252 |

OTHER PUBLICATIONS

Samsung, (R1-091881, Initial random access in asymmetric carrier aggregation), May 4-8, 2009, 3GPP TSG RAN WG1 #57, whole document.*

* cited by examiner

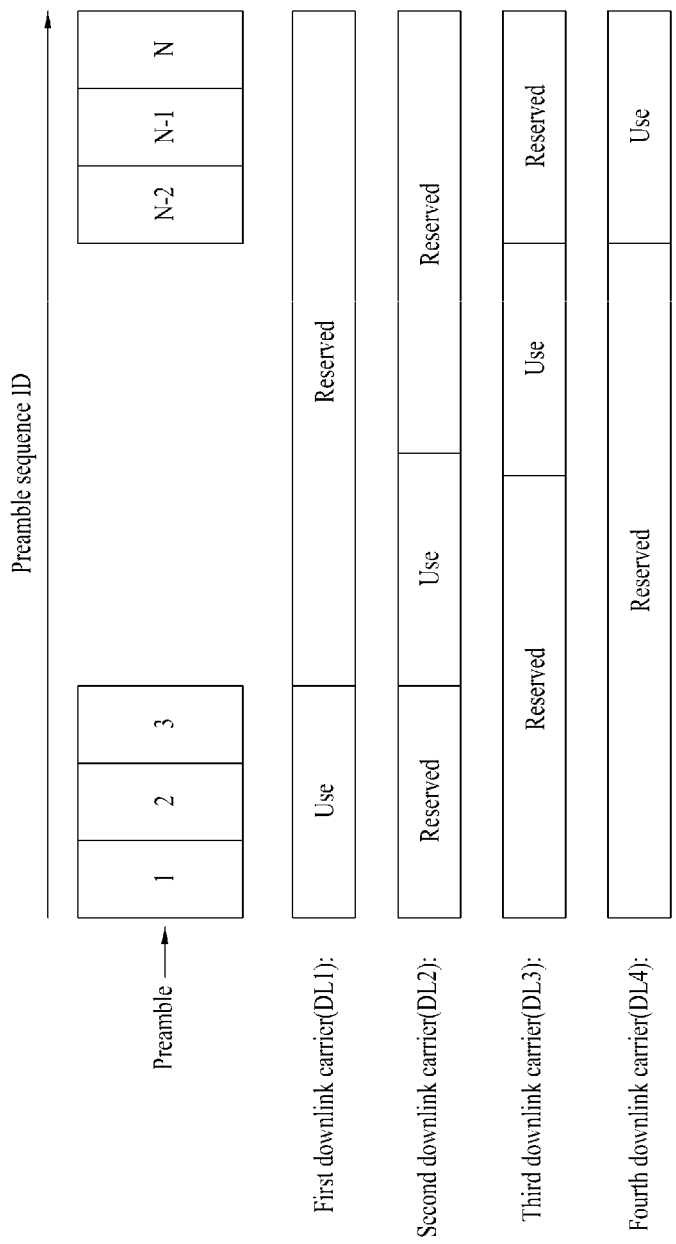

METHOD FOR RANDOM ACCESS TO UPLINK IN MULTI-CARRIER AGGREGATION ENVIRONMENT

This application is the National Stage filing under 35 U.S.C. 371 of International Application No. PCT/KR2009/006281, filed on Oct. 29, 2009, which claims the benefit of earlier filing date and right of priority to Korean Application No. 10-2009-0041555, filed on May 13, 2009, and also claims the benefit of U.S. Provisional Application Ser. No. 61/109,189, filed on Oct. 29, 2008, the contents of all of which are incorporated by reference herein in their entireties.

TECHNICAL FIELD

The present invention relates to a wireless mobile communication system, and more particularly, to an access method between an initial access mobile station and a base station.

BACKGROUND ART

A wireless mobile communication system such as a long term evolution (LTE) system includes a single downlink and a single uplink. In other words, a single uplink carrier and a single downlink carrier exist to correspond to each other. Also, in the LTE system, since one of downlink and uplink carriers designated by a base station is selected as a carrier used by a mobile station, it is possible to definitely identify what carrier is used to transmit and receive a signal. However, an IMT-advanced system that provides a multi-carrier environment supports a wider communication frequency band by extending a single carrier system of the related art, and considers a method for supporting higher throughput based on the wider communication frequency band. Under the circumstances, a problem occurs in carrier identity, which has not occurred when the single uplink/downlink carrier of the related art has been used. The problem of carrier identity means a problem of identity as to which one of a plurality of downlink carriers is used by a mobile station as illustrated in FIG. 1 below.

Referring to FIG. 1, it is assumed that two carriers DL1 and DL2 for a downlink exist and a single carrier UL1 for an uplink exists. FIG. 1 illustrates a problem that occurs when a base station responds to random access performed by a mobile station in a state that two downlink carriers DL1 and DL2 are a single uplink carrier UL1 are aggregated. The base station can transmit information of the system by using the first downlink carrier DL1 and/or the second downlink carrier DL2. In this case, if the mobile station performs cell search through the first downlink carrier DL1 and receives the information of the system, it can obtain information on frequency and band of the uplink corresponding to the first downlink carrier DL1 when the information of the system is the same as that of the single carrier system according to the related art. Accordingly, the mobile station transmits a random access preamble in accordance with random access configuration obtained through the downlink by using the corresponding uplink. When receiving the random access preamble, the base station can identify that the mobile station accesses the system by detecting the preamble. However, since the base station cannot identify which one of the first downlink carrier DL1 and the second downlink carrier DL2 has been used by the corresponding mobile station to access the system, a problem occurs in that it is difficult for the base station to use which one of the first downlink carrier DL1 and the second downlink carrier DL2 to respond to the mobile station. In other words, a problem occurs in that ambiguity occurs in an initial access process.

DISCLOSURE

Technical Problem

If the downlink and the uplink do not correspond to each other through one-to-one correspondence relation in the multi-carrier environment, a problem occurs in that the base station cannot identify a downlink used by the mobile station to access the system even though the base station detects a random access signal transmitted from the mobile station. The present invention is directed to methods for identifying a downlink carrier used by a mobile station.

Technical Solution

In one aspect according to the present invention, a method for identifying a downlink carrier used by a mobile station among a plurality of downlink carriers in a wireless mobile communication system based on the plurality of downlink carriers comprises the steps of transmitting a downlink message from a base station, the downlink message including a first downlink message having first downlink identification information and a second downlink message having second downlink identification information, the first downlink message being transmitted through a first downlink carrier and the second downlink message being transmitted through a second downlink carrier; and identifying that the mobile station has received the downlink message through the first downlink carrier by receiving an uplink message in the base station, to which the first downlink identification information is applied, the uplink message being transmitted from the mobile station after the mobile station has the first downlink message through the first downlink carrier.

Preferably, the mobile station does not receive the second downlink carrier during the above steps. The method further comprises the step of receiving a random access signal transmitted from the mobile station.

In another aspect of the present invention, a method for identifying a downlink carrier used by a mobile station among a plurality of downlink carriers in a wireless mobile communication system based on the plurality of downlink carriers comprises the steps of transmitting a random access signal from the mobile station to a base station through an uplink carrier; receiving first downlink identification information, which is included in a first downlink message transmitted in response to the random access signal, in the mobile station through a first downlink carrier; and transmitting an uplink message an uplink message, to which the first downlink identification information is applied, from the mobile station to the base station through the uplink carrier, wherein the first downlink message is transmitted together with a second downlink carrier having a second downlink message transmitted from the base station in response to the random access signal, the second downlink message having second downlink identification information, and the first downlink identification information applied to the uplink message transmitted from the mobile station is used by the base station to identify that the mobile station has received the downlink signal through the first downlink carrier.

In still another aspect of the present invention, a method for identifying a downlink carrier used by a mobile station among a plurality of downlink carriers in a wireless mobile communication system based on the plurality of downlink carriers comprises the steps of transmitting a downlink message from a base station, the downlink message including a first downlink message having first downlink identification information and a second downlink message having second downlink identification information, the first downlink message being transmitted through a first downlink carrier and the second downlink message being transmitted through a second downlink carrier; and receiving the first downlink message in the mobile station through the first downlink carrier; transmitting an uplink message, to which the first downlink identification information is applied, from the mobile station to the base station through an uplink carrier; and identifying that the mobile station has received the downlink message through the first downlink carrier by identifying, through the base station, that the downlink identification applied to the uplink message is the first downlink identification information.

In further still another aspect of the present invention, a method for identifying a downlink carrier used by a mobile station among a plurality of downlink carriers in a wireless mobile communication system based on the plurality of downlink carriers comprises the steps of transmitting first downlink identification information through a first downlink carrier and second downlink identification information through a second downlink carrier from a base station; receiving a random access preamble in the base station from the mobile station, the random access preamble corresponding to the first downlink identification information; and identifying that the mobile station has used the first downlink carrier by detecting the first downlink identification information from the random access preamble in the base station. The random access preamble transmitted from the mobile station is different from a random access preamble corresponding to the second downlink identification information.

In further still another aspect of the present invention, a method for identifying a downlink carrier used by a mobile station among a plurality of downlink carriers in a wireless mobile communication system based on the plurality of downlink carriers comprises the steps of receiving first downlink identification in the mobile station from a base station through a first downlink carrier; and generating a random access preamble corresponding to the first downlink identification information in the mobile station and transmitting the generated random access preamble, wherein the first downlink carrier is transmitted from the base station together with a second downlink carrier having second downlink identification information, and the first downlink identification information corresponding to the transmitted random access preamble is used by the base station to identify that the mobile station has received the downlink signal through the first downlink carrier.

In further still another aspect of the present invention, a method for identifying a downlink carrier used by a mobile station among a plurality of downlink carriers in a wireless mobile communication system based on the plurality of downlink carriers comprises the steps of transmitting first downlink identification information through a first downlink carrier and second downlink identification information through a second downlink carrier from a base station; receiving the first downlink identification information in the mobile station through the first downlink carrier; generating a random access preamble corresponding to the first downlink identification information in the mobile station and transmitting the generated random access preamble; and identifying that the mobile station has used the first downlink carrier by detecting the first downlink identification information from the random access preamble in the base station.

In further still another aspect of the present invention, a method for identifying a downlink carrier used by a mobile station among a plurality of downlink carriers in a wireless mobile communication system based on the plurality of downlink carriers comprises the steps of transmitting first downlink identification information through a first downlink carrier and second downlink identification information through a second downlink carrier from a base station; receiving the first downlink identification information in the mobile station through the first downlink carrier; generating a random access preamble corresponding to the first downlink identification information in the mobile station and transmitting the generated random access preamble; and identifying that the mobile station has used the first downlink carrier by detecting the first downlink identification information from the random access preamble in the base station.

In further still another aspect of the present invention, a method for indicating a downlink carrier to be used by a mobile station among a plurality of downlink carriers in a wireless mobile communication system based on the plurality of downlink carriers comprises the steps of transmitting a downlink message from a base station, the downlink message including a first downlink message having information on an uplink resource and a second downlink message having information on the uplink resource, the first downlink message being transmitted through a first downlink carrier and the second downlink message being transmitted through a second downlink carrier; indicating inter-frequency handover from the base station to the mobile station.

The plurality of downlink carriers are aggregated with the uplink carrier through which the uplink message is transmitted. The first downlink message and the second downlink message are response messages to the random access signal. Each of the first downlink identification information and the second downlink identification information is any one of preamble code information, control channel resource information, and time-frequency resource information, which are used by the mobile station. The preamble code information indicates a unique value of a preamble code. The time-frequency resource information is resource information used for uplink transmission by the mobile station. The uplink message is masked by using the identity information. Preferably, the random access preamble transmitted from the mobile station is different from a random access preamble corresponding to the second downlink identification information. Preferably, a time-frequency location of the random access preamble corresponding to the first downlink identification information is different from a time-frequency location of the random access preamble corresponding to the second downlink identification information.

Advantageous Effects

According to the embodiments of the present invention, the base station can efficiently identify a downlink carrier used by the mobile station in a state that several downlink carriers are aggregated.

BRIEF DESCRIPTION OF THE DRAWINGS

FIG. 7 is a diagram illustrating an example that use of a preamble sequence is limited per carrier in accordance with the present invention.

MODE FOR CARRYING OUT THE INVENTION

Reference will now be made in detail to the preferred embodiments of the present invention, examples of which are illustrated in the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on some terminologies, the following description will not be limited to such terminologies and other terminologies may be designated as same meaning. Also, wherever possible, the same reference numbers will be used throughout the drawings to refer to the same or like parts.

In this specification, when some part "includes" some elements, it means that the part can further include other elements unless mentioned to the contrary.

The technology according to the present invention, which will be described later, can be used for various wireless communication systems. A wireless communication system for providing various communication services such as voice and packet data is provided. A base station (BS) means a fixed station that performs communication with a user equipment. Also, the base station may be referred to as a node-B, a base transceiver system (BTS), or an access point (AP). A mobile station may be fixed or mobile, and may be referred to as a user equipment (UE), a user terminal UT, a subscriber station (SS), or a wireless device.

Figure 1:
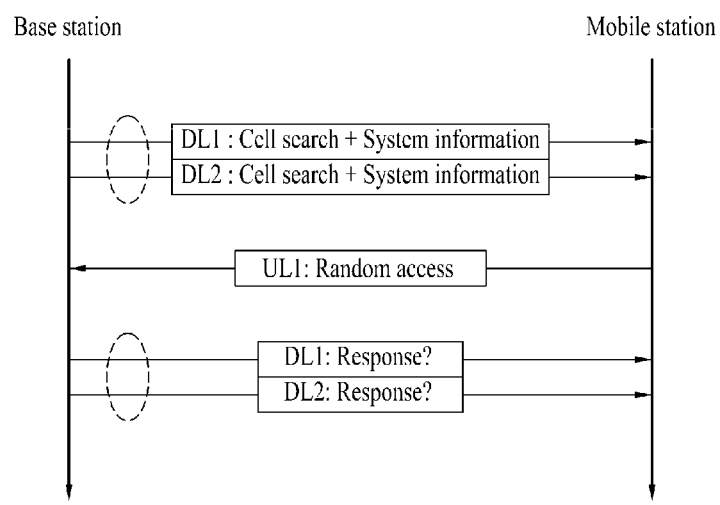
FIG. 1 is a diagram illustrating an example of carrier aggregation of two downlink carriers and a single uplink carrier.
Figure 2:
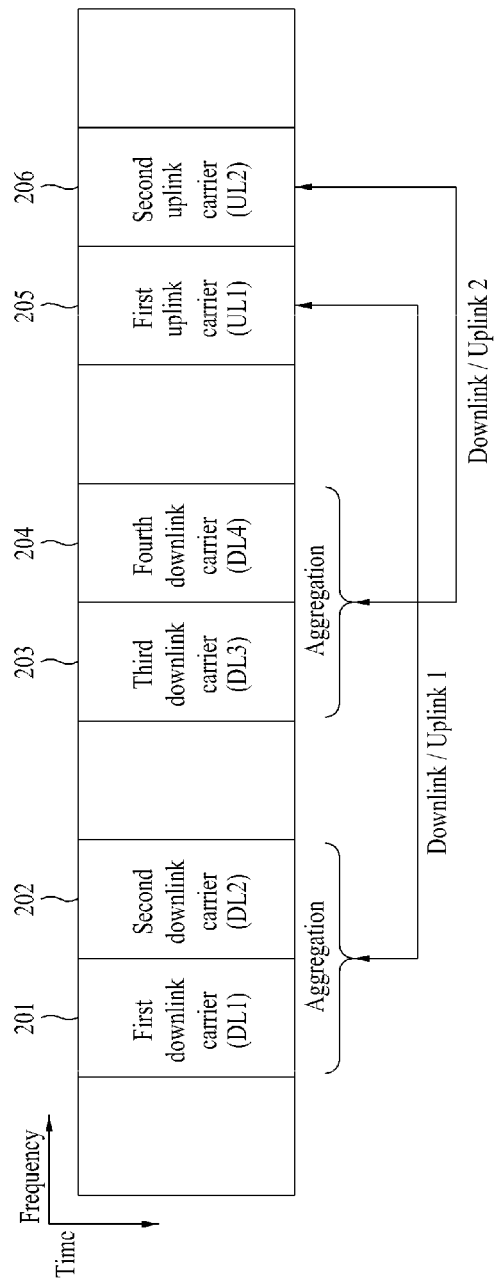
FIG. 2 is a diagram illustrating an example of carrier aggregation according to the present invention, in which four downlink carriers and two uplink carriers are used.

FIG. 2 is a diagram illustrating an example of carrier aggregation according to the present invention, in which four downlink carriers 201, 202, 203 and 204 and two uplink carriers 205 and 206 are used. In this example, two downlink carriers are aggregated with one uplink carrier. In more detail, the first downlink carrier 201 and the second downlink carrier 202 are aggregated with the first uplink carrier 205, and the third downlink carrier 203 and the fourth downlink carrier 204 are aggregated with the second uplink carrier 206. In other words, a downlink signal should be transmitted to a mobile station that uses the first uplink carrier 205, through the first downlink carrier 201 and the second downlink carrier 202, and should be transmitted to a mobile station that uses the second uplink carrier 206, through the third downlink carrier 203 and the fourth downlink carrier 204.

In a state that carriers are aggregated as illustrated in FIG. 2, the mobile station can perform cell search through the first downlink carrier 201 and receive information of the system. Then, the mobile station can transmit a random access preamble to the base station through the first uplink carrier 205 aggregated with the first downlink carrier 201. However, even though the base station receives the random access preamble, since it cannot identify which one of the first downlink carrier 201 and the second downlink carrier 202 has been used by the mobile station to receive the information of the system, a problem occurs in that the base station cannot identify whether to respond to the mobile station by using which one of the first downlink carrier 201 and the second downlink carrier 202.

In order to solve the problem, as the simplest method, the base station can transmit a response signal by using both the first downlink carrier 201 and the second downlink carrier 202. However, according to this method, a problem occurs in that resources of the downlink are wasted and contention resolution between mobile stations cannot be performed. Also, a problem occurs in that response and resource allocation should be performed for all downlinks at a specific time, i.e., until a process of exchanging capability information between the base station and the mobile station and allowing the base station and the mobile station to be operated on a specific carrier is finished. As another method, the mobile station can perform initial access through a specific downlink only. For example, an LTE-A mobile station can perform initial access through cell-specific carrier indication such as anchor carrier, prime carrier, and reference carrier. Alternatively, for LTE/LTE-A mobile stations, modifications may be made in a synchronization channel or system information of the other carriers except for a specific one carrier, so that initial access may not be performed. In this case, when the mobile station accesses a specific carrier, since unique uplink/downlink relationship can be obtained, ambiguity at the base station is removed. However, a problem occurs in that mobile stations are concentrated on one carrier and a legacy support mode cannot be used for the other carriers, whereby a problem occurs in compatibility with the related art system. As still another method, there is provided a method for configuration of a random access channel (RACH) differently. In other words, a preamble sequence set used for random access or physical time/frequency resources may be varied. Since different preamble sequences can be allocated to a random access signal, the preamble sequence can be used as an identifier for identifying a downlink used by the mobile station. In this case, since the downlink carriers correspond to configuration for different random accesses, the base station can identify a downlink carrier corresponding to the corresponding random access configuration when detecting the preamble, whereby the base station can identify the downlink used by the mobile station. However, if different preamble sequence sets are applied to the respective downlink carriers, since more preamble sequences than those of the legacy system are used, a preamble sequence reuse factor is varied, whereby a problem in compatibility with the related art system occurs. Also, if physical time/frequency resources are varied, a problem occurs in that resources of the uplink are wasted.

In order that the mobile station and the base station perform communication with each other through the same downlink and uplink carriers, a safeguard should be provided during initial access. The mobile station performs cell search through a specific downlink carrier to access the system and receives system information to discover configuration of the system. Then, the mobile station can discover frequency location and band, in which an uplink signal will be transmitted, through uplink channel information recorded in the system information. According to the present invention, the mobile station transmits a random access preamble through the corresponding uplink channel, and the base station detects the random access preamble signal and then can react with ambiguity of the downlink carrier of the mobile station as follows.

First of all, if the base station detects the random access preamble, it can use a method for transmitting a response at the same time through all downlink carriers connected with the corresponding uplink carrier (method 1).

Second, as the base station detects the random access preamble, a method for identifying a downlink carrier can be used (method 2).

Third, a method for acquiring downlink carrier access information of a random mobile station in a base station while controlling overhead of the first method and overhead of the second method as the first method and the second method are used at the same time can be used (method 3).

Hereinafter, the above three methods will be described in due order.

In order to describe the embodiment of the present invention, terminologies, message 1, message 2, message 3, message 4 and message 5 will be defined. The message 1 means an uplink message transmitted for random access from the mobile station. The message 2 means a downlink message transmitted from the base station is a response message to the message 1. The message 3 means an uplink message transmitted from the mobile station, and is a message transmitted subsequently to the message 2. The message 4 means a downlink message transmitted from the base station, and is a message transmitted subsequently to the message 3. The message 5 means an uplink message transmitted from the mobile station, and is a message transmitted subsequently to the message 4.

Method 1

According to the first method (method 1) of the present invention, if the base station detects a random access preamble, it transmits a response at the same time through all downlink carriers connected to the corresponding uplink carrier. In this case, the base station should discover the downlink carrier through which the mobile station has accessed the system, through additional hand-shaking between the base station and the mobile station. Although a mobile station for LTE-advanced (LTE-A) having new capability can include hand-shaking with the base station, a legacy mobile station should depend on message of the existing single carrier. Accordingly, in the case that a response signal is transmitted to all downlink carriers associated with the corresponding uplink carrier, the following schemes can be used to determine a location of the downlink carrier. First of all, a scheme for allocating a location of uplink-grant (UL-grant) differently per downlink carrier can be used (scheme 1-A). In this case, UL-grant is a response to an uplink resource requested from the mobile station, wherein the response indicates that the mobile station may use the uplink resource. Information on a time-frequency resource of the uplink which will be used by the mobile station may be included in the UL-grant, or may be transmitted together with the UL-grant. Second, a scheme for allocating the location of the Ul-grant uniformly regardless of downlink carriers can be used (scheme 1-B). These schemes will be described below.

First of all, the scheme 1-A according to the present invention will be described. In this case, the base station cannot identify the location of the downlink carrier when transmitting the response to the random access preamble. However, resources (time/frequency resource, control channel resource, preamble code resource, or another identification information transfer) to be used by the mobile station through the uplink carrier are differently defined in the response transmitted through each of the downlink carriers, whereby the base station can identify the downlink carrier used by the mobile station when receiving the response from the mobile station through the uplink.

Figure 3:
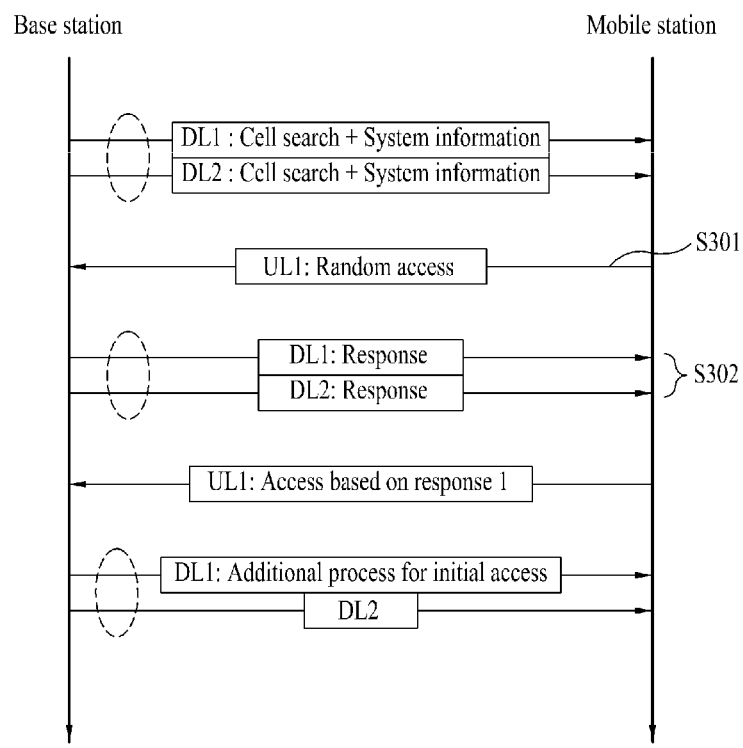
FIG. 3 is a diagram illustrating a method for configuring uplink resource allocation varied per downlink carrier in a first downlink response to a random access request when two downlink carriers and a single uplink carrier are aggregated in accordance with one embodiment of the present invention.

FIG. 3 is a diagram illustrating a method for configuring uplink resource allocation varied per downlink carrier in a first downlink response to a random access request when two downlink carriers and a single uplink carrier are aggregated in accordance with one embodiment of the present invention. If the mobile station transmits a random access request message (message 1) to the base station (S301), the base station transmits a response message (message 2), which grants uplink transmission through a first uplink resource ULR1, through the first downlink carrier DL1, and transmits a response message (message 2), which grants uplink transmission through a second uplink resource ULR2, through the second downlink carrier DL2 (S302). The mobile station transmits an uplink message through an uplink resource indicated in the response received therein. In this embodiment, since the mobile station receives a random access response message through the first downlink carrier DL1, it transfers an uplink message (message 3) by using the first uplink resource UL1 (S303). In this case, the base station can easily identify that the downlink carrier used by the mobile station is the first downlink carrier DL1.

Figure 4:
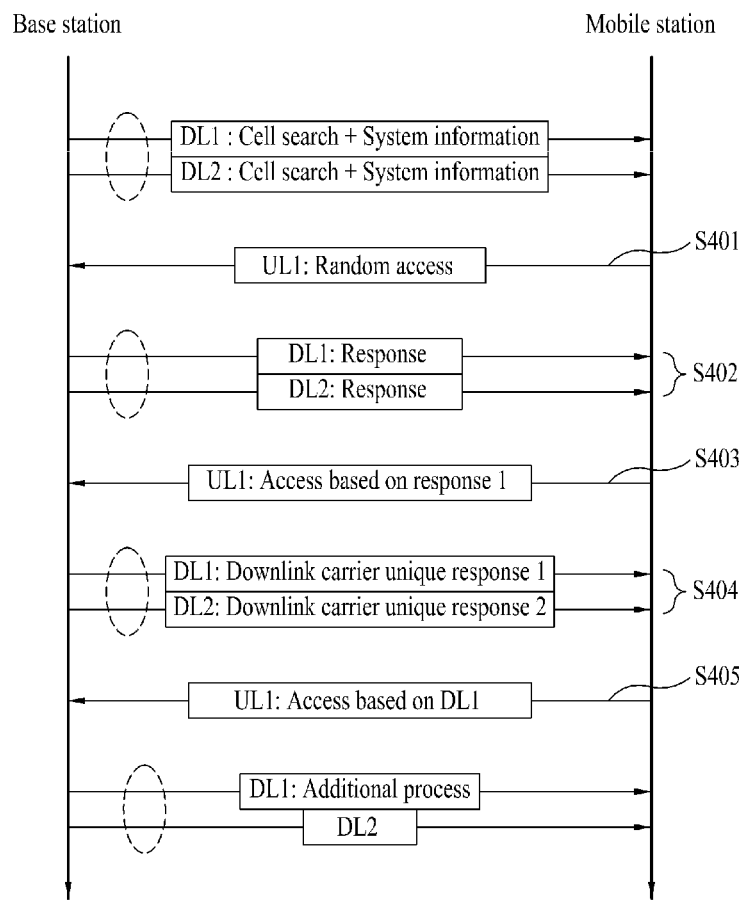
FIG. 4 is a diagram illustrating a method for configuring uplink resource allocation varied per downlink carrier in a second downlink response to a random access request when two downlink carriers and a single uplink carrier are aggregated in accordance with another embodiment of the present invention.

FIG. 4 is a diagram illustrating a method for configuring uplink resource allocation varied per downlink carrier in a second downlink response to a random access request when two downlink carriers and a single uplink carrier are aggregated in accordance with another embodiment of the present invention. If the mobile station transmits a random access request message (message 1) to the base station (S401), the base station transmits a response message (message 2), which grants uplink transmission through the same uplink resource, through the first downlink carrier DL1 and the second downlink carrier DL2 (S402). The mobile station transmits a message (message 3) through an uplink resource indicated by the response message (S403). Even though the base station receives the message 3, it cannot identify which one of the first downlink carrier DL1 and the second downlink carrier DL2 has been used by the mobile station. Then, the base station transmits a response message (message 4), which grants uplink transmission through the first uplink resource ULR1, through the first downlink carrier DL1, and transmits a response message (message 4), which grants uplink transmission through the second uplink resource ULR2, through the second downlink carrier DL2 (S404). The mobile station transmits the uplink message through the uplink resource indicated in the response message received therein. In this embodiment, since the mobile station receives a random access response message through the first downlink carrier DL1, it transfers an uplink message (message 5) by using the first uplink resource UL1 (S405). In this case, the base station can easily identify that the downlink carrier used by the mobile station is the first downlink carrier DL1.

In addition to the method for configuring physical resources allocated for uplink transmission differently depending on the downlink, if an identity ID to be used by the mobile station is designated in each message transaction, a method for configuring the corresponding ID differently per downlink carrier can be considered. Accordingly, when the response to the preamble is transmitted, if a mobile station ID associated with the ID indicating the downlink carrier is generated, ambiguity of the downlink carrier can be removed effectively. In other words, the mobile station ID associated with the ID indicating the downlink carrier can be generated in the step S301, whereby the IDs can be transmitted together. For example, a temporary cell radio network temporary identifier (C-RNTI) (i.e., mobile station ID), which will be used for transmission of the message 3, is indicated together with a random access channel (RACH) response message which is the message 2. The temporary C-RNTI is allocated differently per downlink carrier, and the base station can identify the frequency location (i.e., carrier index) of the downlink carrier through which the mobile station has accessed the system, by detecting temporary C-RNTIs per downlink carrier when receiving the message 3. In this case, cyclic redundancy check (CRC) masking may be performed for a CRC part of the message 3 with the C-RNTI acquired by the mobile station, or temporary C-RNTI based bit level scrambling may be applied onto the message 3. At this time, the mobile station transmits the message 3 through scrambling based on the temporary C-RNTI received through the downlink carrier through which the mobile station has accessed the system, among temporary C-RNTIs configured differently per downlink carrier. The base station descrambles and decodes the message 3, and identifies temporary C-RNTI used for scrambling by the mobile station, by using the CRC. As a result, the base station can identify a downlink carrier through which the mobile station has accessed the system. However, in the case that different mobile stations transmit the same preamble signal by using the same uplink carrier while accessing the system through different downlink carriers, since each of the mobile stations responds to each downlink signal, a problem may occur in that contention resolution cannot be made. In this case, a contention resolution process should be performed for each mobile station during message processing after the message 3.

Next, the scheme 1-B according to the present invention will be described. In this case, since the base station does not know the location of the downlink carrier when transmitting the response to the random access preamble, it transmits the response to all downlink carriers associated with the uplink carrier in which the preamble is detected. However, the corresponding UL-grant refers to the same uplink resource (time/frequency resource, control channel resource, preamble code resource, or identification information) for the message 3. In this case, although waste of the uplink resource may not occur, signal transmission should be performed at the same time through all the downlink carriers associated with the uplink carrier during message exchange. Although capability negotiation of the mobile station is performed during the initial access process, if the legacy system fails to specify association of carrier frequency, the base station should command the corresponding mobile station to perform inter-frequency handover. Inter-frequency handover exists between LTE mobile stations, and means that handover from one carrier to another carrier is performed. This inter-frequency handover function can be used by the LTE-A base station to resolve initial downlink ambiguity. In other words, in a state that ambiguity of the downlink carrier is not resolved, if the base station commands the mobile station to perform handover to a specific downlink carrier, it can predict that the corresponding mobile station will access the corresponding carrier. If not so, a repeated message should continuously be transmitted through all the downlink carriers.

Figure 5:
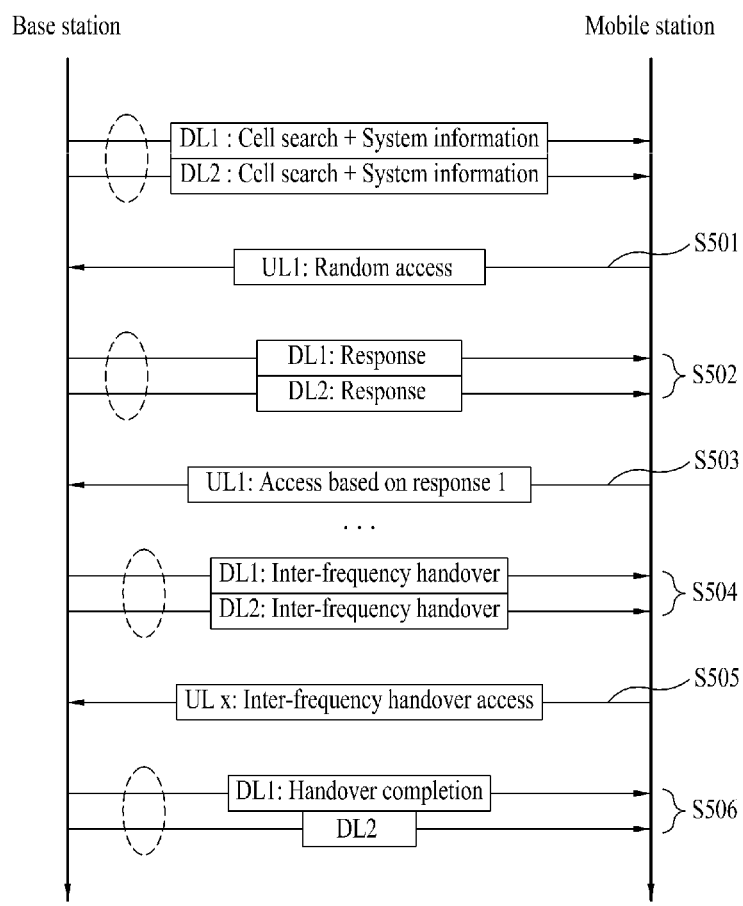
FIG. 5 is a diagram illustrating an initial access process according to one embodiment of the present invention.

FIG. 5 is a diagram illustrating an initial access process according to one embodiment of the present invention. According to this embodiment, if the mobile station transmits a random access request message (message 1) (S501), the base station a response (message 2) to the random access request message through the first downlink carrier DL1 and the second downlink carrier DL2 (S502). However, the response transmitted through the first downlink carrier DL1 and the second downlink carrier DL2 does not include additional information for identifying the first downlink carrier DL1 and the second downlink carrier DL2. After receiving the response to the random access request message, the mobile station transmits the message 3 (S503). Afterwards, the mobile station performs downlink transmission through the first downlink carrier DL1 and the second downlink carrier DL2 until inter-frequency handover to the first downlink carrier DL1 is commanded (S504). If the mobile station follows inter-frequency handover command (S505), the base station starts to transmit the downlink message through the first downlink carrier DL1 only.

Method 2

According to the second method (method 2) of the present invention, the base station can identify a downlink carrier by detecting a random access preamble used for a random access request signal. In this case, a random access resource is configured differently per downlink carrier. At this time, if the mobile station performs cell search through a specific downlink carrier and obtains system information, it obtains the configuration of the random access resource corresponding to the specific downlink carrier. If the mobile station determines a preamble based on the obtained configuration of the random access resource and transmits the preamble to the uplink, the base station, which detects the transmitted preamble, can easily discover the location of the downlink carrier used by the mobile station through the time/frequency location of the preamble or preamble ID. To this end, the following three schemes can be used. First of all, a scheme of configuring time/frequency resources differently can be used (scheme 2-A). Second, a scheme of configuring preamble sequence differently can be used (scheme 2-B). Third, a scheme of using a single random access configuration can be used (scheme 2-C). The three schemes will be described in due order.

First of all, the scheme 2-A according to the present invention will be described. In this scheme, time/frequency location of the random access resource, which will be used for the uplink carrier, is defined differently per downlink carrier. In this case, there is no difference even if the preamble sequence is uniformly configured or differently configured per carrier. If the preamble is detected from the uplink carrier through search of time/frequency location where a specific RACH exists, since the base station can directly identify the downlink carrier for the corresponding RACH, ambiguity as to the downlink carrier used by the mobile station does not exist. However, as too many RACH resources should be defined in the uplink, this scheme may be used inefficiently.

Figure 6:
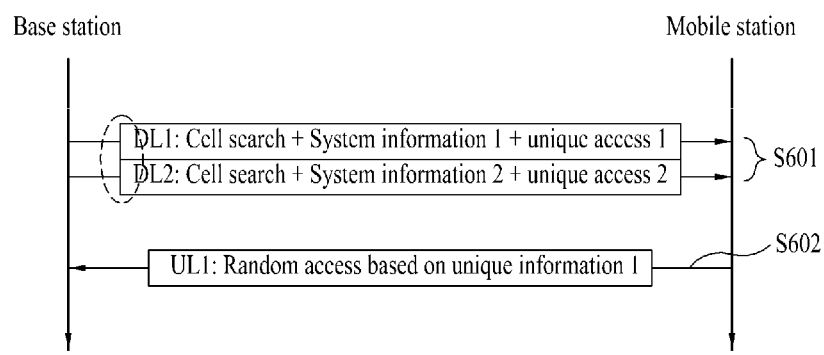
FIG. 6 is a diagram illustrating a process of performing initial access by configuring a random access resource per downlink carrier, which will be used by a mobile station, in accordance with one embodiment of the present invention.

FIG. 6 is a diagram illustrating a process of performing initial access by configuring a random access resource per downlink carrier, which will be used by a mobile station, in accordance with one embodiment of the present invention. The base station transmits information for cell detection, system information and unique identification information per downlink through the first downlink carrier DL1 and the second downlink carrier DL2 (S601). At this time, the mobile station can use the identification information to transmit random access request. Examples of the identification information include location of the preamble and/or the uplink resource, temporary ID allocated to the mobile station, and a data demodulation reference symbol indicator (cyclic shift). Also, the identification information is designated differently for each of the first downlink carrier DL1 and the second downlink carrier DL2. The mobile station transmits a temporary access request message (message 1) by using the location of the preamble and/or the uplink resource and/or the temporary ID defined in the step S601 and/or a designated reference symbol signal (S602). The base station can identify the location of the preamble and/or the uplink resource and/or the temporary ID defined in the step S601 and/or the designated reference symbol signal, which are used by the mobile station, by receiving the message 1. Accordingly, the base station can identify which one of the first downlink carrier DL1 and the second downlink carrier DL2 has been used by the mobile station. Although the aforementioned step may be transmitted through the downlink of the message 2, it may be transmitted through the downlink of the message 4. If the aforementioned step is transmitted through the message 4, in order to identify the corresponding message, the base station allows the mobile station to perform a downlink carrier resolution step through the message 5. In this case, in order that the operation of the mobile station is performed regardless of the legacy mobile station and the LTE-A mobile station, the base station may perform random uplink traffic. To this end, a channel measurement value may be reported.

Next, the scheme 2-B according to the present invention will be described. In this scheme, in order to prevent physical resource waste of the uplink RACH from occurring, the base station indicates the mobile station to use different preamble sequences per downlink carrier when reporting the random access resource to the mobile station. In this case, if the base station detects the preamble, it can identify the location of the downlink carrier used depending on an identifier of the preamble. However, a problem occurs in that many preamble sequences are used. For example, since the LTE legacy system includes 64 preamble opportunities for random access configuration, 64 preambles of different sets should be configured such that different legacy mobile stations use different preamble sequences. In this case, a problem may occur in that a reuse factor of the RACH used at deployment of the LTE system is reduced at a factor equivalent to the number of aggregated carriers.

The aforementioned embodiment of FIG. 6 can easily be applied to the scheme 2-B. This is because that preamble information per carrier can be included in downlink identification information transmitted in the step S601.

Finally, the scheme 2-C according to the present invention will be described. In this scheme, all the downlink carriers are configured for the same random access resource. When preamble sequences included in a preamble sequence set for initial access are allocated, if the random access preamble is allocated such that preamble sequences used for RACH message 1 for PRACH (physical RACH) preamble transmission of the mobile station are differentiated from one another per downlink carrier, the base station can acquire information of the downlink carrier through which the mobile station has accessed the system, by using the preamble sequences detected through the uplink carrier. At this time, each of the plurality of downlink carriers can receive a synchronization channel (SCH), a broadcast channel (BCH), and/or a broadcast control channel (BCCH), for example. According to a detailed example of this scheme, if the legacy system serves to divide a resource that can be used for the RACH so as not to use a part of the resource, information of the preamble sequence of which use is prohibited for the RACH can be transmitted through each downlink carrier. In other words, even though several downlink carriers mean the same basic preamble set and RACH time/frequency domain resources, preamble opportunities which will actually be used per carrier can be defined differently within the corresponding preamble set. In this case, as preamble sequences, which are not used per downlink carrier, are allocated differently, the preamble sets for random access, which will actually be used by the mobile stations that have accessed the system through each downlink carrier, can be configured disjointly. In this case, the base station can determine what preamble set includes the detected preamble sequence identifier. Accordingly, since the base station can determine what downlink carrier grants the determined preamble set, ambiguity for the downlink carrier does not exit. To this end, in case of random access of the LTE, the base station can determine a preamble sequence used by a media access control (MAC) layer and use a dedicated preamble sequence to limit use of the preamble sequence. In order to limit use of the preamble sequence which will be used for initial access per downlink carrier, hashing or previously defined set configuration can be used. Alternatively, among all preamble sets, a set of preamble sequences that can be used, may be indicated. In order to identify preamble sets, a hashing scheme, a logical index dividing scheme, a contiguous division scheme, and an arbitrary set definition scheme may be considered. The hashing scheme is to map a logical sequence identifier into several specific values in accordance with a certain equation rule. The logical index dividing scheme is a simple format such as modulo operation. In this case, modulo unit and other values are designated. The contiguous division scheme designates start and end of logical index to indicate a use range, wherein start and end values are applied by modulo operation. The arbitrary set definition scheme is to define previously defined sets based on a certain standard such as effect on frequency offset and effect on peak-to-average power ratio/cubic metric (PAPR/CM). In order to identify the preamble sets, RACH-ConfigCommon and RACH-ConfigDedicated information can be used. These RACH-ConfigCommon and RACH-ConfigDedicated parameters are disclosed in the 3GPP TS 36.331 reference. For example, there are provided a scheme for identifying a random access preamble for preamble group A and preamble group B defined in the RACH-ConfigCommon information document and a scheme for configuring a portion only corresponding to a random contiguous interval as a preamble that can be used by the mobile station, through combination of a random access preamble and a dedicated preamble defined in the RACH-ConfigDedicated information.

When use of an initial access preamble sequence is limited for a specific downlink carrier, if disjoint sets cannot be configured, the base station can vary a repetition rate of the preamble sequences that can be used per downlink carrier. For example, if the base station intends to block access of the mobile station through a specific downlink carrier, it can configure the preamble sequences in such a manner that all preamble sequences are not used for the specific downlink carrier, and can allocate the preamble sequences to the downlink carrier only that allows access of the mobile station. In this case, if some set of the downlink carriers is reserved such that all preamble sequences are not used and another some set allows the initial access preamble sequence to be used, identification between downlink groups can be performed. At this state, the aforementioned scheme for identifying a downlink carrier can be used.

The embodiment of FIG. 6 can easily be applied to the scheme 2-C. This is because that the downlink identification information transmitted in the step S601 can include information on limit of preamble sequence per carrier.

FIG. 7 is a diagram illustrating an example that use of a preamble sequence is limited per carrier in accordance with the present invention. In this embodiment, the preamble sequence includes N opportunities, and M (for example, M=4) downlink carriers are used. At this time, preamble sequence 1 to preamble sequence floor (N/M) are allocated to the first downlink carrier DL1, preamble sequence floor(N/M)+1 to preamble sequence 2*floor(N/M) are allocated to the second downlink carrier DL2, preamble sequence 2*floor(N/M)+1 to preamble sequence 3*floor(N/M) are allocated to the third downlink carrier DL3, and preamble sequence 3*floor (N/M)+1 to preamble sequence 4*floor(N/M) are allocated to the fourth downlink carrier DL4. The mobile station that has performed initial access through a specific downlink carrier can perform random access by selecting one of the preamble sequence sets.

The aforementioned second method (method 2) can be used together with the aforementioned first method (method 1), as described hereinafter.

Method 3

According to the third method, as the first method (method 1) and the second method (method 2) are used at the same time, the base station can acquire downlink carrier access information of a random mobile station while controlling overhead of the first method and overhead of the second method. Hereinafter, a detailed example of the third method will be described. For application of the second method (method 2), the base station divides all downlink carriers into a random number (more than 1) of downlink carrier groups. Each of the downlink carrier groups includes one or more downlink carriers, and index indicating each group can be allocated to each group. At this time, time-frequency resource and/or configuration of the preamble for initial random access and/or preamble sequence set are defined per downlink carrier group. The base station indicates the time-frequency resource and/or configuration of the preamble for initial random access and/or the preamble sequence set for the mobile station by using system information. The mobile station transmits the message 1 by using the time-frequency resource and/or configuration of the preamble for initial random access and/or the preamble sequence set. The base station that has received the message 1 can determine a downlink carrier group through which the mobile station has accessed the system, by acquiring index information of the downlink carrier group. The base station transmits the message 2 by using downlink carriers within the determined downlink carrier group. At this time, different C-RNTIs are allocated per downlink carrier within the downlink carrier group to which the message 2 is transmitted. The mobile station applies CRC masking and/or bit-level scrambling to the message 3 by using the C-RNTI corresponding to the downlink carrier through which the mobile station has accessed the system, and then transmits the message 3 to the base station. When receiving the message 3, the base station performs CRC check per candidate of the C-RNTI, whereby the base station can acquire downlink carrier information through which the mobile station has accessed the system. In other words, the base station can identify the downlink carrier information through which the mobile station has accessed the system, within the downlink carrier group through the scheme 1-A of the method 1. Unlike the scheme 1-A, if the scheme 1-B of the method 1 is used, the other initial random access process (i.e., inter-frequency handover) can be performed as described in the scheme 1-B of the aforementioned method 1 after the downlink carrier group is identified through the aforementioned method 2.

Although the base station has used the location of the preamble and/or the uplink resource and/or the temporary identifier allocated to the mobile station as the identification information for identifying the plurality of downlinks in the aforementioned embodiments, it will be apparent to those skilled in the art that the scope of the present invention is not limited by the specific identification information.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between the base station and the mobile station. In this case, the base station means a terminal node of a network, which performs direct communication with the mobile station. A specific operation which has been described as being performed by the base station may be performed by an upper node of the base station as the case may be. In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), and an access point (AP). Also, the mobile station may be replaced with terms such as a user equipment (UE), a subscriber station (SS), a mobile subscriber station (MSS), a mobile terminal (MT) and a terminal.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used for a wireless mobile communication system having downlink-uplink configuration where a plurality of downlink carriers correspond to one uplink carrier.

The invention claimed is:

1. A method of a base station for communicating with a mobile station via a downlink carrier used by the mobile station among a plurality of downlink carriers in a wireless mobile communication system, the method comprising:

transmitting limitation information of preamble sequences associated with the plurality of downlink carriers to the mobile station, the limitation information indicating reserved preamble sequences for each of the plurality of downlink carriers, wherein the reserved preamble sequences are differently allocated to each of the plurality of downlink carriers based on the number of preamble opportunities and the number of the plurality of downlink carriers, and wherein a first group of downlink carriers among the plurality of downlink carriers is set to allow to use initial access preamble sequence and to allow access of the mobile station, and wherein a second group of downlink carriers among the plurality of downlink carriers is set to have only reserved sequences and to not allow access of the mobile station, and;

receiving a random access signal transmitted from the mobile station, wherein the random access signal is allocated to an uplink carrier, wherein the random access signal is set based on a preamble set excluding a reserved preamble sequence for a specific downlink carrier among the plurality of downlink carriers;

transmitting a downlink message in response to the random access signal, the downlink message including a first downlink message having first downlink identification information and a second downlink message having second downlink identification information, the first downlink message transmitted via a first downlink carrier and the second downlink message transmitted via a second downlink carrier, wherein the first downlink identification information is the same as the second downlink identification information;

receiving an access signal from the mobile station via the uplink carrier, the access signal corresponding to the downlink message;

transmitting a command message indicating inter-frequency handover to the first downlink carrier, the command message transmitted via the first and second downlink carriers;

receiving an uplink message transmitted by the mobile station after the mobile station has performed the inter-frequency handover; and transmitting an additional downlink message to the mobile station via the first downlink carrier, the additional downlink message transmitted based on receiving the uplink message without transmitting the additional downlink message via the second downlink carrier.

2. The method of claim 1, wherein each of the first downlink identification information and the second downlink identification information is preamble code information, control channel resource information, or time-frequency resource information, which are used by the mobile station.

3. The method of claim 1, wherein each of the first downlink identification information and the second downlink identification information includes identity information for identifying the mobile station.

4. A method of a mobile station for communicating with a base station via a downlink carrier used by the mobile station among a plurality of downlink carriers in a wireless mobile communication system, the method comprising:

receiving limitation information of preamble sequences associated with the plurality of downlink carriers, the limitation information indicating reserved preamble sequences for each of the plurality of downlink carriers, wherein the reserved preamble sequences are differently allocated to each of the plurality of downlink carriers based on the number of preamble opportunities and the number of the plurality of downlink carriers, and wherein a first group of downlink carriers among the plurality of downlink carriers is set to allow to use initial access preamble sequence and to allow access of the mobile station, and wherein a second group of downlink carriers among the plurality of downlink carriers is set to have only reserved sequences and to not allow access of the mobile station, and;

transmitting a random access signal to the base station via an uplink carrier, wherein the random access signal is allocated to the uplink carrier, wherein the random access signal is set based on a preamble set excluding a reserved preamble sequence for a specific downlink carrier among the plurality of downlink carriers;

receiving a first downlink message transmitted via a first downlink carrier in response to the random access signal, the first downlink message including first downlink identification information;

transmitting a first uplink message via the uplink carrier in response to the first downlink message;

receiving a command message transmitted via the first downlink carrier, the command message indicating inter-frequency handover to a second downlink carrier, the second downlink carrier having transmitted a second downlink message from the base station in response to the random access signal, the second downlink message including second downlink identification information that is the same as the first downlink identification information;

performing the inter-frequency handover to the second downlink carrier; and transmitting a second uplink message via the uplink carrier after performing the inter-frequency handover, the second uplink message indicating the mobile station has performed the inter-frequency handover.

5. The method of claim 4, wherein each of the first downlink identification information and the second downlink identification information is identity information for identifying the mobile station.

* * * * *